June 19, 1951 T. SUMMERS 2,557,580
LOG LOADING AND TRANSPORTING VEHICLE
Filed Aug. 6, 1949 2 Sheets-Sheet 2

INVENTOR
THEODORE SUMMERS
BY Arnold Y. Von
ATTORNEY

Patented June 19, 1951

2,557,580

UNITED STATES PATENT OFFICE 2,557,580

LOG LOADING AND TRANSPORTING VEHICLE

Theodore Summers, Hemlo, Ontario, Canada, assignor to The Ontario Paper Company Limited, Thorold, Ontario, Canada Application August 6, 1949, Serial No. 109,015

3 Claims. (Cl. 214—85)

This invention relates to a loading apparatus especially designed for loading of materials such as logs on to the body of a vehicle.

Moving wood in the bush presents a difficult and expensive problem. By reason of their natural distribution the logs have to be moved by a primary hauling system to a central point where the concentration of logs warrants the expense of a more developed secondary hauling system involving heavier equipment. The problem of moving the primary or initial haul to points of heavy concentration is one which involves considerable expense. Mechanical logging systems have been used whereby the logs are skidded with winches but unless the ground carries heavy stands of timber the use of winches is not always warranted.

The object of the present invention is to provide a light mobile device to bring the logs to the concentration point particularly where the stands of timber are light or mixed and where numerous set-ups of heavy equipment are not warranted.

One object of the invention is to provide a loading apparatus wherein a multiplicity of logs or the like can be loaded on to the vehicle as a group in a single operation.

Another object of the invention is to provide a vehicle for the purpose of loading and transporting heavy objects, particularly logs and the like, of a simple but sturdy construction whereby logs or the like may be easily and quickly lifted and placed in position upon the vehicle, the whole being capable of withstanding the strain imposed upon it by the heavy materials handled by it.

With these and other objects in view the invention consists in certain details of construction and combination and arrangements of parts all as will hereinafter be more fully described and the novel features thereof particularly pointed out in the appended claims.

In the accompanying drawings

Figure 1:
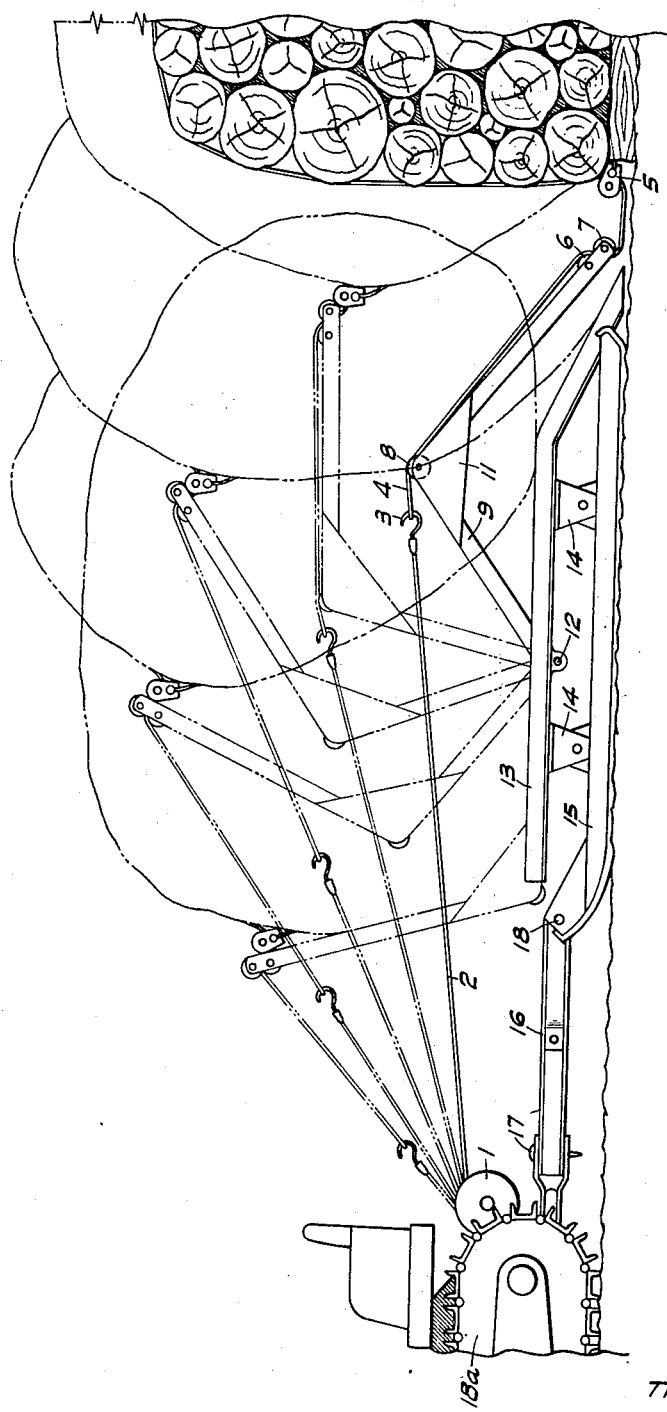
Figure 2:
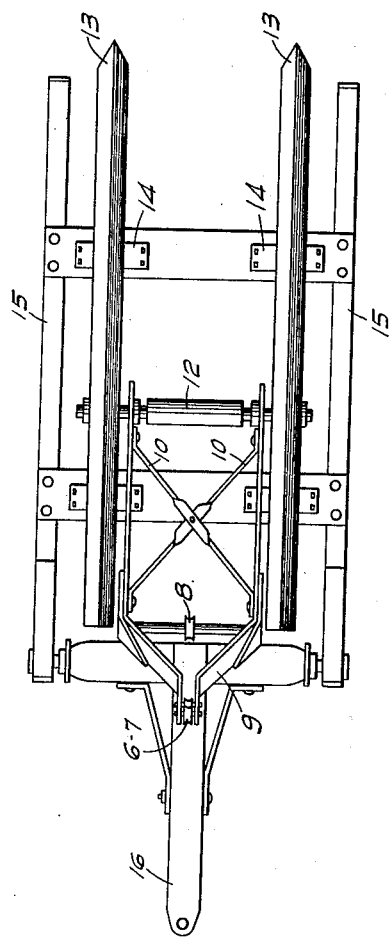

Fig. 1 is a side elevational view of a vehicle equipped with the form of loading and transporting apparatus contemplated by the present invention, and Fig. 2 is a plan view thereof.

Apparatus embodying the invention may be mounted for transportation in any suitable manner, either on a vehicle provided with a source of motive power or on a wheeled or sledded frame or sloop which may be pulled by a tractor or any other motive power. In the drawings, said apparatus is, by way of example, shown mounted on a supporting body or sloop which comprises sleds or runner frame 15. The sloop is suitably attached by means of a tongue or drawbar 16 and pins or eye-bolt connections 17 and 18 with a suitable tractor shown diagrammatically at 18a. It is to be understood, however, that the specific form of the structure thus far described is not part of the present invention, and that any suitable structure may be employed. Referring particularly to the drawings, 1 is a cable winding drum motorized by the hauling tractor which winds the cable 2 thereon, the said cable terminating in a cable hook 3 or any other suitable connecting device. A sling or choker 4, which has been previously placed around the logs to be loaded on the sloop and which passes under pulley 5 and between pulleys 6 and 7 and over roller 8, is connected to cable hook 3. Roller 8 is positioned on the apex of the lifting and holding knee frame 9, which is of substantially shallow V shape and pivoted at 12 to the load supporting frame and swingable from a load engaging position in which its free leg extends over the rear end of the load supporting frame with the apex of the V upward to a load holding position in which the pivoted leg abuts the load supporting frame in the vicinity of the front end thereof, whereby the free leg acts as an abutment for the load, as will hereafter appear. As the cable 2 is hauled by the winch the slack is taken out of the sling 4 and thus gradually binds the pile of logs tightly. As the hauling on cable 2 continues the knee frame 9, which is rigidly constructed and strengthened with cross bracing 10 and gusset plates 11, moves in a radius around shaft 12 located in bearings supported by sloop upper frame 13, and in so doing tends to lift the pile in a substantially vertical direction, at the same time dragging it up and along the ways of the sloop, the rear end of which is downwardly inclined to facilitate the movement of the pile of logs as it is drawn upward and forward on the sloop.

This motion continues until the knee frame has reached its extreme position at which time the pile of logs is fully resting in position on the load carrying frame of the sloop. This frame with its supports 14 is connected by bolts or other suitable means to the sleds or runner frame 15. The sloop is connected to the tractor or other means of locomotion by means of drawbar 16 supplied with eye bolt connections 17 and 18. In its final position the free leg of the V shaped knee frame 9 acts as an abutment against which the pile of logs or other load is adapted to rest. For greater security, although it is not essential or a part of the present invention, a chain, one end of which is fastened to the rear of the sloop may then be thrown over the load and hooked to the free leg of the knee frame 9 after which sling 4 is disconnected from cable 2 and the logs hauled away as required.

In use the sloop or loading device is taken to a pile of logs and backed up against it by the tractor. The choker or sling 4 is fed through the pulleys 5, 6 and 7 and attached to winch cable 2 by hook 3. The arm or knee frame 9 is then tilted backwards so that its outward tip falls at the base of the pile. As the winch exerts pressure on the rope or cable 2 the choker 4 binds the pile tightly and winds the slack which has been taken out of the choker. The arm or knee frame 9 begins to lift the end of the pile on to the loader. The arm or knee frame 9 then returns to its normal position on the upper frame as the pile is winched on as shown by the progression of added positions in Figure 1.

It will be apparent that the apparatus embodying the invention is simple, inexpensive and sturdy enough to stand the heavy work required of it. Logs to be transported are lifted and placed on the sloop by the single operation of hauling in the cable 2. The ease and simplicity of the device will be apparent.

It will be understood that the invention is not limited to the form described and illustrated in the drawings, for example, the winch or winding drum for the cable 2 may be either manually or power operated, the loading apparatus together with the source of motive power may constitute a single vehicle, or the loading apparatus may be constructed as a tractor attachment. Changes may also be made in the details of construction and arrangement of the various parts without departing from the spirit of the invention.

What I claim as my invention is:

1. In a load transporting vehicle, in combination, a load supporting frame inclined downwardly rearwardly of the vehicle, means for simultaneously lifting a load and drawing it onto the frame and for holding the load in place when loaded comprising a lifting and holding member of substantially shallow V shape pivoted at one end in said frame and swingable from a load engaging position in which its free leg extends over the rear end of the frame with the apex of the V upward to a load holding position in which the pivoted leg abuts the frame in the vicinity of the front end thereof, whereby the free leg acts as an abutment for the load, cable draft means, cable guide means in the free extremity of the V-shaped member, a cable running from the cable draft means through said cable guide means and terminating in load engaging means, and means at the apex of the V-shaped member for guiding the cable thereover when the V-shaped member is in the load engaging position.

2. A load transporting vehicle as claimed in claim 1 wherein the V-shaped lifting and holding member constitutes a cradle upon which the load rests when the said member is in the load carrying position.

3. A load transporting vehicle as claimed in claim 1 wherein the pivoted leg of the V-shaped lifting and holding member swings from an upwardly and rearwardly inclined position to a substantially horizontal load carrying position.

THEODORE SUMMERS.

REFERENCES CITED

The following references are of record in the file of this patent:

UNITED STATES PATENTS

| Number | Name | Date |
|---|---|---|
| 1,793,545 | De Rocher | Feb. 24, 1931 |
| 2,058,473 | Le Tourneau | Oct. 27, 1936 |
| 2,251,435 | Anthony | Aug. 5, 1941 |
| 2,405,299 | Godwin | Aug. 6, 1946 |
| 2,411,821 | Choat | Nov. 26, 1946 |
| 2,413,048 | Hurd | Dec. 24, 1946 |